United States Patent
Andersen

(10) Patent No.: US 8,752,907 B2
(45) Date of Patent: Jun. 17, 2014

(54) DUAL WHEEL CENTERING SYSTEM, METHOD AND KIT

(76) Inventor: James H. Andersen, Windosr, CO (US)

( * ) Notice: Subject to any disclaimer, the term of this patent is extended or adjusted under 35 U.S.C. 154(b) by 334 days.

(21) Appl. No.: 13/294,278

(22) Filed: Nov. 11, 2011

(65) Prior Publication Data

US 2013/0118693 A1    May 16, 2013

(51) Int. Cl.
*B60B 3/16*    (2006.01)
*B60B 11/02*    (2006.01)

(52) U.S. Cl.
USPC ............ 301/35.627; 301/35.621; 301/35.628; 301/35.632; 301/36.1; 29/894.321

(58) Field of Classification Search
CPC .......... B60B 3/14; B60B 3/145; B60B 3/147; B60B 3/16; B60B 11/02
USPC ............. 301/35.621, 35.623, 35.626, 35.627, 301/35.628, 35.629, 35.632, 36.1; 29/894.321
See application file for complete search history.

(56) References Cited

U.S. PATENT DOCUMENTS

| | | | |
|---|---|---|---|
| 1,618,887 A | 2/1927 | Putnam | |
| 1,889,837 A * | 12/1932 | Michelin | 301/35.632 |
| 1,940,675 A * | 12/1933 | Crowther | 301/35.628 |
| 2,017,114 A | 10/1935 | Winchester | |
| 2,283,860 A * | 5/1942 | Manning | 301/36.1 |
| 2,404,520 A * | 7/1946 | Mosher | 301/36.1 |
| 2,844,409 A | 7/1958 | Eksergian | |
| 2,911,256 A * | 11/1959 | Canady et al. | 301/36.1 |
| 4,240,670 A | 12/1980 | Zorn et al. | |
| 4,679,860 A * | 7/1987 | Koishi et al. | 301/35.632 |
| 4,708,397 A | 11/1987 | Weinmann | |
| 4,832,413 A | 5/1989 | Waggoner | |
| 4,885,834 A * | 12/1989 | Beerman | 29/426.5 |
| 6,070,946 A | 6/2000 | Holmes | |
| 6,715,843 B2 | 4/2004 | Teague | |
| 7,111,909 B2 * | 9/2006 | Andersen | 301/35.627 |
| 7,407,045 B2 * | 8/2008 | Hofmann et al. | 188/382 |

FOREIGN PATENT DOCUMENTS

JP    07228101 A  *  8/1995

* cited by examiner

*Primary Examiner* — Kip T Kotter
(74) *Attorney, Agent, or Firm* — Ancel W. Lewis, Jr.

(57) ABSTRACT

A centering system for centering the inner and outer wheels of a dual wheel assembly on a hub includes at least three centering sets. Each centering set has an inner sleeve and a separate outer sleeve. Each inner sleeve fits between a wheel stud on the hub and a bolt hole in the inner wheel to center the inner wheel. Each outer sleeve fits between the wheel stud and a bolt hole in the outer wheel to center the outer wheel. The inner sleeves can also include a section that fits between the wheel stud on the hub and a bolt hole in the brake drum to center the brake drum.

19 Claims, 4 Drawing Sheets

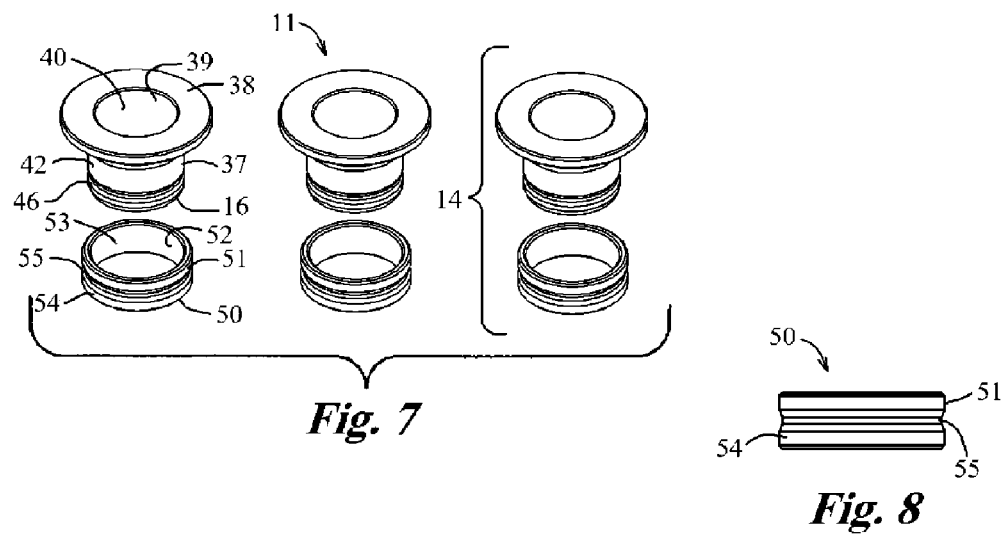
Fig. 7
Fig. 8
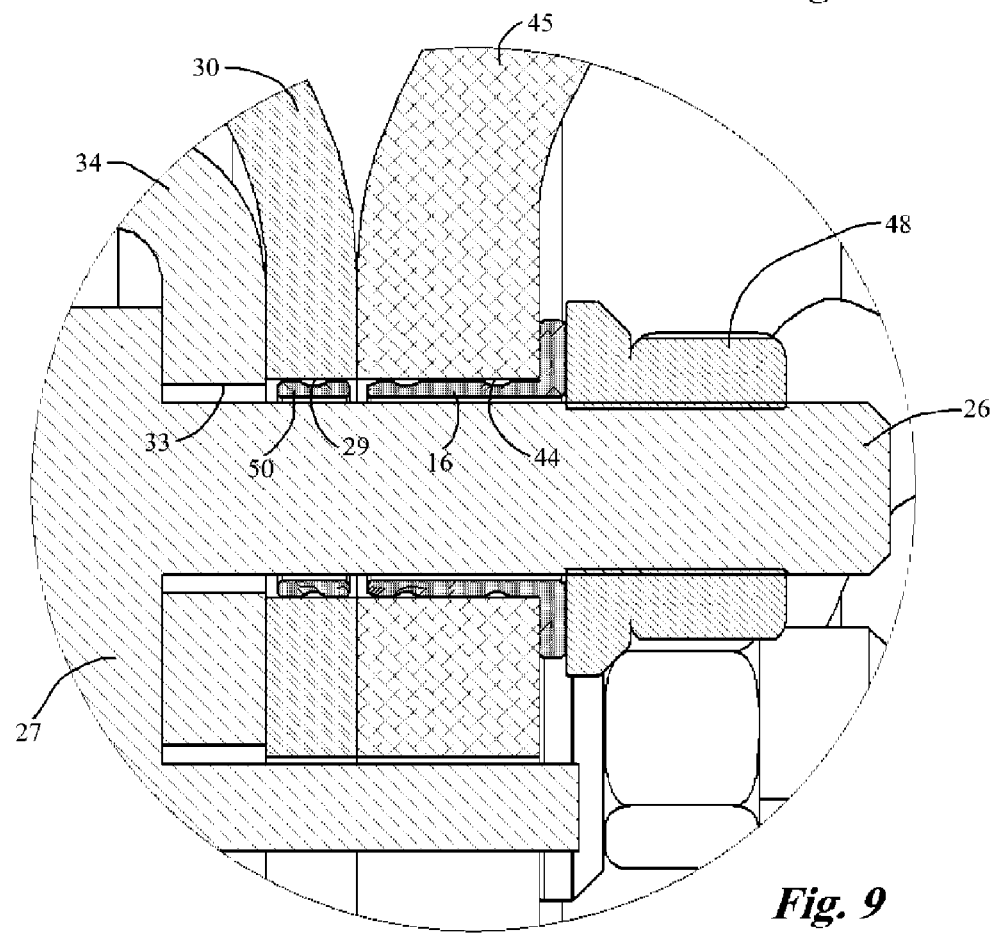
Fig. 9

DUAL WHEEL CENTERING SYSTEM, METHOD AND KIT

TECHNICAL FIELD

The present invention relates to mounting vehicle wheels on hubs and more particularly to a system, method and kit for centering dual wheel assemblies on the hubs of a vehicle.

BACKGROUND ART

The two primary systems for centering wheels on the hubs of motor vehicles are stud piloted and hub piloted. Dual wheel assemblies are used on many large vehicles such as buses and semi rigs. The dual wheel assemblies, with a stud piloted system, require an inner cap nut on each stud to center and secure the inner wheel and an outer cap nut on each stud to center and secure the outer wheel. Dual wheel assemblies, with a hub piloted system, use a one or two piece flange nut on each stud to secure both the inner and outer wheels. An "18 wheeler" has on the tractor a front steer axle with two single wheel assemblies and two rear axles each having two dual wheel assemblies, and on the trailer two rear axles each having two dual wheel assemblies, for a total of two single wheel assemblies and eight dual wheel assemblies. With ten studs per hub, 180 nuts are required with a stud piloted system compared to the 100 nuts required with a hub piloted system.

A hub piloted system provides material and labor cost reduction through the elimination of the inner cap nut. Other benefits of hub piloted systems include elimination of bolt hole chamfer wear, greater clamping force for a given torque, reduction in nut wear and nut replacement, and more consistent nut torque retention. In hub piloted systems, the hubs generally have a plurality of circumferentially spaced hub pilots that center the hub aperture of the wheel. There is generally a small clearance between the hub pilots on the hub and the hub aperture on the wheel to facilitate wheel installation. When the wheel is mounted on the hub, gravity pulls the wheel down, and the wheel is not precisely centered.

U.S. Pat. No. 2,017,114 to Winchester discloses a nut assembly with a skirt that extends through the bolt aperture of the outer wheel and into the bolt aperture of the inner wheel of a dual wheel assembly. U.S. Pat. No. 6,070,946 to Holmes teaches that the skirt of Winchester that extends through the bolt aperture of the outer wheel and into the bolt aperture of the inner wheel can create undue difficulty in installing the nut assembly and jamming of the nut assembly due to relative movement of the inner and outer wheels. Holmes discloses a skirted nut that extends only into the bolt aperture of the outer wheel of a dual wheel assembly. U.S. Pat. No. 6,715,843 to Teague discloses a sleeve for centering a brake drum and a single wheel.

DISCLOSURE OF THE INVENTION

A centering system for centering a dual wheel assembly on a hub includes a plurality of centering sets. Each set has an inner sleeve and a spaced outer sleeve. The inner sleeve has an interior surface defining an interior bore sized to slide onto a wheel stud on the hub and a wheel aperture portion with an exterior surface sized to slide into a bolt aperture on the inner wheel. The wheel aperture portion is shorter than the thickness of the inner wheel. The inner sleeve can also have a drum aperture portion connected to the wheel aperture portion. The drum aperture portion has an exterior surface sized to slide into a bolt aperture on a brake drum mounted between the hub and the inner wheel. The drum aperture portion is shorter than the thickness of the brake drum. The outer sleeve has an interior bore sized to slide onto the wheel stud. The outer sleeve includes a wheel aperture portion with an exterior surface sized to slide into a bolt aperture on the outer wheel and a flange that projects radially outwardly from the wheel aperture portion. The wheel aperture portion is shorter than the thickness of the outer wheel. The wheel aperture portions of the inner and outer sleeves each have circumferential grease grooves. Generally, three centering sets are used to center a dual wheel assembly. A kit of six centering sets is used to center the dual wheel assemblies of both hubs on an axle. A method of centering a dual wheel assembly on a hub includes the steps of providing a plurality of centering set each having an inner sleeve and an outer sleeve, mounting the brake drum on the hub, then assembling the inner sleeves on selected wheel bolts on the hub, then mounting the inner wheel, then mounting the outer wheel, and then assembling the outer sleeves to the selected wheel bolts.

BRIEF DESCRIPTION OF THE DRAWINGS

Details of this invention are described in connection with the accompanying drawings that bear similar reference numerals in which:

FIG. 7 is a perspective view of the centering system of FIG. 1 with an alternative inner sleeve.

FIG. 8 is a side elevation view of an inner sleeve of the system of FIG. 7.

FIG. 9 is an enlarged detail view of the circled area of FIG. 5 with the inner sleeve of FIG. 7.

DETAILED DESCRIPTION OF THE INVENTION

Figure 1:
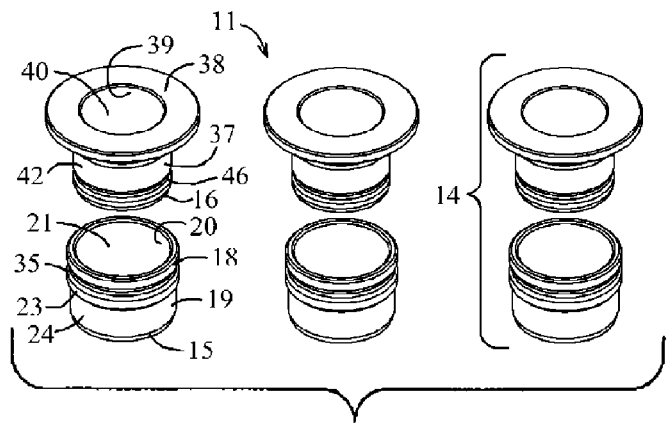
FIG. 1 is a perspective view of a centering system embodying features of the present invention.
Figure 2:
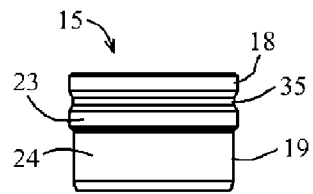
FIG. 2 is a side elevation view of an inner sleeve of the system of FIG. 1.
Figure 3:
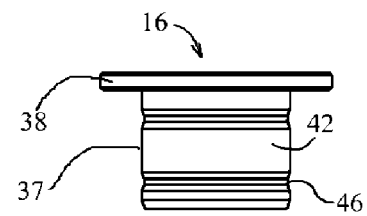
FIG. 3 is a side elevation view of an outer sleeve of the system of FIG. 1.
Figure 4:
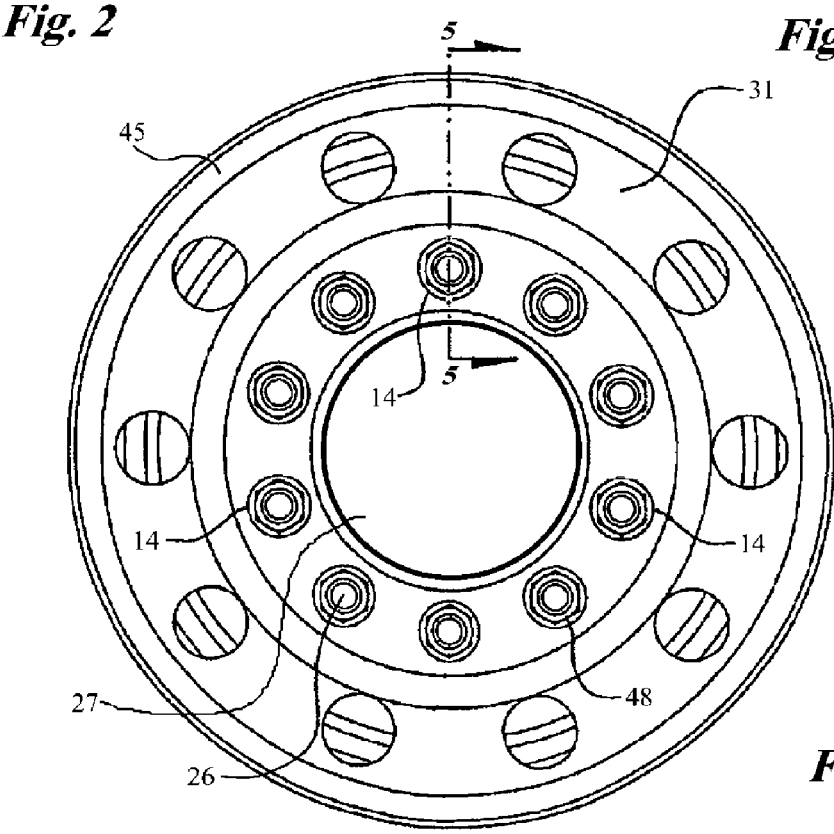
FIG. 4 is a side elevation view of the centering system of FIG. 1 installed on a hub with a dual wheel assembly.
Figure 5:
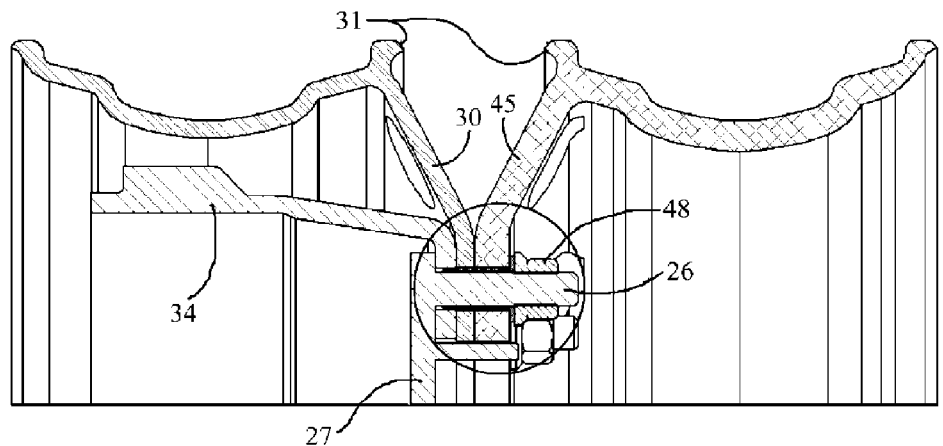
FIG. 5 is a partial sectional view taken along line 5-5 of FIG. 4.
Figure 6:
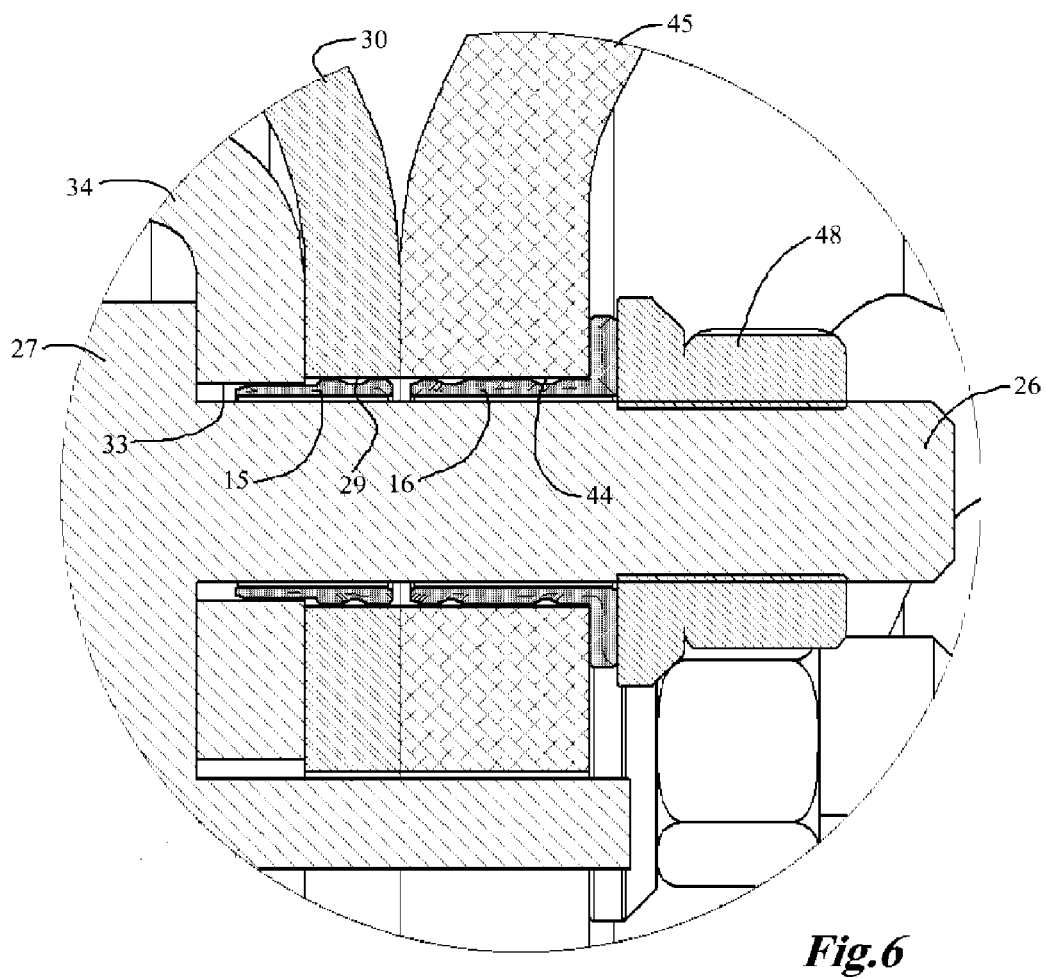
FIG. 6 is an enlarged detail view of the circled area of FIG. 5.

Referring to FIGS. 1 to 6, a centering system 11, embodying features of the present invention, includes a plurality of centering sets 14. Each centering set has an inner sleeve 15 and a separate outer sleeve 16. The inner sleeve 15 includes a wheel aperture portion 18 and a drum aperture portion 19 connected to the wheel aperture portion 18. The inner sleeve 15 has a cylindrical interior surface 20 that defines an interior bore 21 that extends through the wheel aperture portion 18 and the drum aperture portion 19.

The wheel aperture portion 18 of the inner sleeve 15 has a substantially cylindrical exterior surface 23 and the drum aperture portion 19 has a cylindrical exterior surface 24. The interior bore 21 of the inner sleeve 15 is sized to fit closely over a wheel stud 26 on a hub 27 of a vehicle. The exterior surface 23 of the wheel aperture portion 18 is sized to fit into a bolt aperture 29 on the inner wheel 30 of a dual wheel assembly 31. The exterior surface 24 of the drum aperture portion 19 is sized to fit into a bolt aperture 33 on a brake drum 34 on the hub 27.

The length of the wheel aperture portion 18 is selected to be less than the thickness of the inner wheel 30. The inner wheel 30 is shown as a steel wheel and the outer wheel 45 is shown as an aluminum wheel in FIG. 4. Aluminum wheels are significantly thicker than steel wheels and the length of the wheel aperture portion 18 of an inner sleeve 15 for an aluminum wheel is longer than the length of the wheel aperture portion 18 of an inner sleeve 15 for a steel wheel. The length of the drum aperture portion 19 is selected to be less than the thickness of the brake drum 34. The exterior surface 23 of the wheel aperture portion 18 includes at least one circumferential grease groove 35. Generally the exterior surface 23 of the shorter wheel aperture portion 18 for steel wheels includes one grease groove 35 and the exterior surface 23 of the longer wheel aperture portion 18 for aluminum wheels includes two grease grooves 35.

The outer sleeve 16 includes a wheel aperture portion 37 and a flange 38 that projects radially outwardly from one end of the wheel aperture portion 37. The outer sleeve 16 has a cylindrical interior surface 39 that defines an interior bore 40 that extends through the wheel aperture portion 37 and the flange 38.

The wheel aperture portion 37 of the outer sleeve 16 has a substantially cylindrical exterior surface 42. The interior bore 40 of the outer sleeve 16 is sized to fit closely over the wheel stud 26. The exterior surface 42 of the wheel aperture portion 37 is sized to fit into a bolt aperture 44 on the outer wheel 45 of the dual wheel assembly 31. The length of the wheel aperture portion 37 is selected to be less than the thickness of the outer wheel 45. The length of the wheel aperture portion 37 of an outer sleeve 16 for an aluminum wheel is longer than the length of the wheel aperture portion 37 of an outer sleeve 16 for a steel wheel. The exterior surface 42 of the wheel aperture portion 37 includes at least one circumferential grease groove 46. Generally the exterior surface 42 of the shorter wheel aperture portion 37 for steel wheels includes one grease groove 46 and the exterior surface 42 of the longer wheel aperture portion 37 for aluminum wheels includes two grease grooves 46.

FIGS. 7, 8 and 9 show the centering system 11 with each centering set 14 having an alternative inner sleeve 50. The inner sleeve 50 has a wheel aperture portion 51, and a cylindrical interior surface 52 that defines an interior bore 53 that extends through the wheel aperture portion 51. The wheel aperture portion 51 of the inner sleeve 50 has a substantially cylindrical exterior surface 54. The interior bore 53 of the inner sleeve 50 is sized to fit closely over a wheel stud 26 on a hub 27 of a vehicle. The exterior surface 54 of the wheel aperture portion 51 is sized to fit into a bolt aperture 29 on the inner wheel 30 of a dual wheel assembly 31.

The length of the wheel aperture portion 51 is selected to be less than the thickness of the inner wheel 30. The length of the wheel aperture portion 51 of an inner sleeves 50 for an aluminum wheel is longer than the length of the wheel aperture portion 51 of an inner sleeves 50 for a steel wheel. The exterior surface 54 of the wheel aperture portion 51 includes at least one circumferential grease groove 55. Generally the exterior surface 54 of the shorter wheel aperture portion 51 for steel wheels includes one grease groove 55 and the exterior surface 54 of the longer wheel aperture portion 51 for aluminum wheels includes two grease grooves 55. The inner sleeves 50 do not have a drum aperture portion and do not center the brake drum 34. The inner sleeves 50 are used with hubs with an inboard brake drum. The inner sleeves 50 can also be used when separate brake drum spacers are used to center the brake drum 34.

Figure 10:
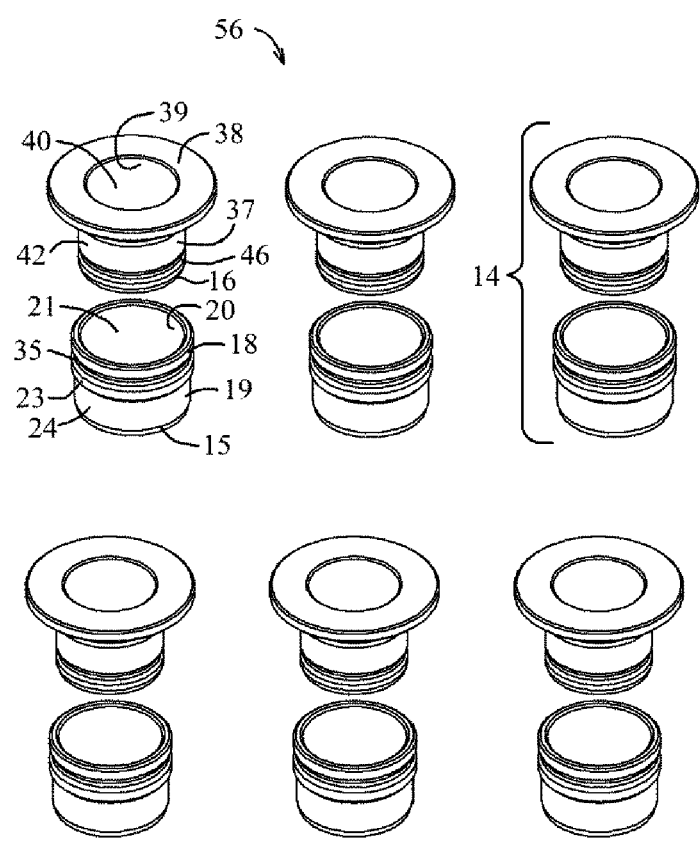
FIG. 10 is a perspective view of a kit of centering devices for the system of FIG. 1.

FIG. 10 shows a kit 56 of the centering sets 14 for the centering system 11. Six centering sets 14 are shown in the kit 56. The kit 56 provides an adequate number of centering sets 14 for centering the dual wheel assemblies 31 on both hubs 27 on an axle.

A method of centering a dual wheel assembly on the hub of a vehicle, embodying features of the present invention, includes the steps of: assembling the inner sleeves onto selected wheel studs on the hub, mounting the inner wheel onto the hub, with the wheel aperture portions of the inner sleeves extending into the bolt apertures of the inner wheel, then mounting the outer wheel onto the hub, and then assembling the outer sleeves onto the selected wheel studs on the hub with the wheel aperture portions of the outer sleeves extending into the bolt apertures of the outer wheel.

Generally the method also includes the steps of: threading flange nuts 48 onto all of the wheel studs after the step of assembling the outer sleeves, and then tightening the flange nuts 48 to the proper torque setting. On hubs with outboard brakes, the method also includes the step of mounting the brake drum to the hub before the step of assembling the inner sleeves. When using inner sleeves 15 with the drum aperture portion 19, the step of assembling the inner sleeves includes assembling the inner sleeves with the drum aperture portion of each inner sleeve extending into a bolt aperture in the brake drum. The method also includes the steps of greasing the grease grooves of the inner sleeves prior to the step of assembling the inner sleeves and greasing the grease grooves of the outer sleeves prior to the step of assembling the outer sleeves.

The selected wheel studs 26 onto which the inner sleeves 15 or 50 and outer sleeves 16 are assembled are distributed on the hub 27 and non-adjacent. The centering system 11 shown has three centering sets 14. By way of examples, and not as limitations, for ten hole wheels, the inner sleeves 15 could be assembled at the wheel studs 26 at 0°, 108° and 252° and for eight hole wheels, the inner sleeves 15 could be assembled at the wheel studs 26 at 0°, 135° and 225°.

The inner sleeves 15 center the brake drum 34 and the inner wheel 30. The outer sleeves 16 center the outer wheel 45. The centering system 11 provides precise centering of both the inner wheel 30 and the outer wheel 45 of the dual wheel assembly 31 without the assembly and disassembly problems associated with prior known systems. The two piece centering sets 14, with the length of the wheel aperture portion 18 of the inner sleeve 15 being less than the thickness of the inner wheel 30 and the length of the wheel aperture portion 37 of the outer sleeve 16 being less than the thickness of the outer wheel 45, makes assembly and disassembly of the dual wheel assembly 31 easier. The inner and outer wheels 30 and 45 can be separately mounted and centered. Since the wheel aperture portion 18 of the inner sleeve 15 does not protrude into the bolt aperture 44 of the outer wheel 45 and the wheel aperture portion 37 of the outer sleeve 16 does not protrude into the bolt aperture 33 of the inner wheel 30, jamming of the dual wheel assembly 31 is prevented.

Although the present invention has been described with a certain degree of particularity, it is understood that the present disclosure has been made by way of example and that changes in details of structure may be made without departing from the spirit thereof.

What is claimed is:

1. A centering system for centering a dual wheel assembly on a hub, said wheel assembly having an inner wheel and an outer wheel, comprising:

a plurality of centering sets each including an inner sleeve and a separate outer sleeve, said inner sleeve having an interior surface defining an interior bore sized to slide onto a wheel stud on said hub, said inner sleeve including a wheel aperture portion with an exterior surface sized to slide into a bolt aperture on said inner wheel, said inner wheel having a thickness at said bolt aperture, said wheel aperture portion having a length less than said thickness of said inner wheel, said outer sleeve having an interior bore sized to slide onto said wheel stud, said outer sleeve including a wheel aperture portion with an exterior surface sized to slide into a bolt aperture on said outer wheel, said outer wheel having a thickness at said bolt aperture, said wheel aperture portion having a length less than said thickness of said outer wheel.

2. The system as set forth in claim 1 wherein said inner sleeve includes a drum aperture portion connected to said wheel aperture portion and having an exterior surface sized to slide into a bolt aperture on a brake drum mounted between said hub and said inner wheel, said brake drum having a thickness at said bolt aperture, said drum aperture portion having a length less than said thickness of said brake drum.

3. The system as set forth in claim 1 wherein said outer sleeve includes a flange that projects radially outwardly from said wheel aperture portion.

4. The system as set forth in claim 3 wherein said inner sleeve includes a drum aperture portion connected to said wheel aperture portion and having an exterior surface sized to slide into a bolt aperture on a brake drum mounted between said hub and said inner wheel, said brake drum having a thickness at said bolt aperture, said drum aperture portion having a length less than said thickness of said brake drum.

5. The system as set forth in claim 1 wherein said exterior surfaces of said wheel aperture portions of said inner and outer sleeves each include a circumferential grease groove.

6. The system as set forth in claim 1 including at least three said centering sets.

7. A system for centering a dual wheel assembly on a hub, said wheel assembly having an inner wheel and an outer wheel, comprising:
    a plurality of centering sets each including an inner sleeve and a separate outer sleeve,
    said inner sleeve having an interior surface defining an interior bore sized to slide onto a wheel stud on said hub, said inner sleeve including a wheel aperture portion with an exterior surface sized to slide into a bolt aperture on said inner wheel, said inner wheel having a thickness at said bolt aperture, said wheel aperture portion having a length less than said thickness of said inner wheel, said exterior surface of said wheel aperture portion having a circumferential grease groove, said inner sleeve including a drum aperture portion connected to said wheel aperture portion, said drum aperture portion having an exterior surface sized to slide into a bolt aperture on a brake drum mounted between said hub and said inner wheel, said brake drum having a thickness at said bolt aperture, said drum aperture portion having a length less than said thickness of said brake drum,
    said outer sleeve having an interior bore sized to slide onto said wheel stud, said outer sleeve including a wheel aperture portion with an exterior surface sized to slide into a bolt aperture on said outer wheel, said outer wheel having a thickness at said bolt aperture, said wheel aperture portion having a length less than said thickness of said outer wheel, said exterior surface of said wheel aperture portion having a circumferential grease groove, said outer sleeve having a flange that projects radially outwardly from said wheel aperture portion.

8. A centering set for a system for centering a dual wheel assembly on a hub, said wheel assembly having an inner wheel and an outer wheel, comprising:
    an inner sleeve with an interior surface defining an interior bore sized to slide onto a wheel stud on said hub and having a wheel aperture portion with an exterior surface sized to slide into a bolt aperture on said inner wheel, said inner wheel having a thickness at said bolt aperture, said wheel aperture portion having a length less than said thickness of said inner wheel, and
    a separate outer sleeve with an interior bore sized to slide onto said wheel stud and having a wheel aperture portion with an exterior surface sized to slide into a bolt aperture on said outer wheel, said outer wheel having a thickness at said bolt aperture, said wheel aperture portion having a length less than said thickness of said outer wheel.

9. The centering set as set forth in claim 8 wherein inner sleeve includes a drum aperture portion connected to said wheel aperture portion and having an exterior surface sized to slide into a bolt aperture on a brake drum mounted between said hub and said inner wheel, said brake drum having a thickness at said bolt aperture, said drum aperture portion having a length less than said thickness of said brake drum.

10. The centering set as set forth in claim 8 wherein said outer sleeve includes a flange that projects radially outwardly from said wheel aperture portion.

11. The centering set as set forth in claim 10 wherein said inner sleeve includes a drum aperture portion connected to said wheel aperture portion and having an exterior surface sized to slide into a bolt aperture on a brake drum mounted between said hub and said inner wheel, said brake drum having a thickness at said bolt aperture, said drum aperture portion having a length less than said thickness of said brake drum.

12. The centering set as set forth in claim 8 wherein said exterior surfaces of said wheel aperture portions of said inner and outer sleeves each include a circumferential grease groove.

13. A centering set for a system for centering a dual wheel assembly on a hub, said wheel assembly having an inner wheel and an outer wheel, comprising:
    an inner sleeve with an interior surface defining an interior bore sized to slide onto a wheel stud on said hub, said inner sleeve having a wheel aperture portion with an exterior surface sized to slide into a bolt aperture on said inner wheel, said inner wheel having a thickness at said bolt aperture, said wheel aperture portion having a length less than said thickness of said inner wheel, said exterior surface of said wheel aperture portion having a circumferential grease groove, said inner sleeve including a drum aperture portion connected to said wheel aperture portion, said drum aperture portion having an exterior surface sized to slide into a bolt aperture on a brake drum mounted between said hub and said inner wheel, said brake drum having a thickness at said bolt aperture, said drum aperture portion having a length less than said thickness of said brake drum, and
    a separate outer sleeve with an interior bore sized to slide onto said wheel stud, said outer sleeve having a wheel aperture portion with an exterior surface sized to slide into a bolt aperture on said outer wheel, said outer wheel having a thickness at said bolt aperture, said wheel aperture portion having a length less than the said thickness of said outer wheel, said exterior surface of said wheel aperture portion having a circumferential grease groove, said outer sleeve having a flange that projects radially outwardly from said wheel aperture portion.

14. A kit for centering dual wheel assemblies on both hubs on an axle, each wheel assembly having an inner wheel and an outer wheel, comprising:

at least six centering sets each including an inner sleeve and a separate outer sleeve, said inner sleeve having an interior surface defining an interior bore sized to slide onto a wheel stud on said hub, said inner sleeve including a wheel aperture portion with an exterior surface sized to slide into a bolt aperture on said inner wheel, said inner wheel having a thickness at said bolt aperture, said wheel aperture portion having a length less than said thickness of said inner wheel, said outer sleeve having an interior bore sized to slide onto said wheel stud, said outer sleeve including a wheel aperture portion with an exterior surface sized to slide into a bolt aperture on said outer wheel, said outer wheel having a thickness at said bolt aperture, said wheel aperture portion having a length less than said thickness of said outer wheel, whereby three said centering sets center said dual wheel assembly on one hub and three said centering sets center said dual wheel assembly on the other hub.

15. A method for centering a dual wheel assembly on a hub, said wheel assembly having an inner wheel and an outer wheel, comprising the steps of:

providing a plurality of centering sets each including an inner sleeve and a separate outer sleeve, said inner sleeve including a wheel aperture portion with an exterior surface sized to slide into a bolt aperture on said inner wheel, said outer sleeve including a wheel aperture portion with an exterior surface sized to slide into a bolt aperture on said outer wheel, assembling said inner sleeves onto selected wheel studs on said hub, mounting said inner wheel onto said hub, with said wheel aperture portions of said inner sleeves extending into said bolt apertures of said inner wheel, then mounting said outer wheel onto said hub, and then assembling said outer sleeves onto said selected wheel studs on said hub with said wheel aperture portions of said outer sleeves extending into said bolt apertures of said outer wheel.

16. The method as set forth in claim 15 including the step of mounting a brake drum to said hub before said steps of assembling said inner sleeves and mounting said inner wheel.

17. The method as set forth in claim 16 wherein said inner sleeves include a drum aperture portion connected to said wheel aperture portion and having an exterior surface sized to slide into a bolt aperture on said brake drum, and said step of assembling said inner sleeves includes assembling said inner sleeves with said drum aperture portion of each inner sleeve extending into a bolt aperture in said brake drum.

18. The method as set forth in claim 15 including the steps of threading flange nuts onto all of said wheel studs after said step of assembling the outer sleeves, and then tightening said flange nuts to the proper torque setting.

19. The method as set forth in claim 15 wherein said selected wheel studs are distributed on said hub and non-adjacent.

\* \* \* \* \*